United States Patent [19]

Katakura

[11] Patent Number: 4,866,775
[45] Date of Patent: Sep. 12, 1989

[54] INTERGRATED MULTISOUND SIGNAL DEMODULATOR CIRCUIT

[75] Inventor: Masayuki Katakura, Kanagawa, Japan

[73] Assignee: Sony Corporation, Tokyo, Japan

[21] Appl. No.: 165,500

[22] Filed: Mar. 8, 1988

[30] Foreign Application Priority Data

Mar. 12, 1987 [JP] Japan ................................. 62-057770

[51] Int. Cl.$^4$ .............................................. H04H 5/00
[52] U.S. Cl. ...................................................... 381/3
[58] Field of Search .............................. 381/2, 3, 4, 27

[56] References Cited

U.S. PATENT DOCUMENTS 4,472,830 9/1984 Nagai ....................................... 381/2
4,716,589 12/1987 Matsui ...................................... 381/3

Primary Examiner—F. W. Isen
Attorney, Agent, or Firm—Hill, Van Santen, Steadman & Simpson

[57] ABSTRACT

A multisound signal demodulator IC has a demodulator for demodulating L+R and L−R signals from a composite input signal and for producing a third signal M when it is present in the composite signal, a matrix circuit for producing L and R signals from the L+R and L−R signals, a pair of changeover switches for supplying either the L and R signals or the M signal to first and second output terminals, and a third changeover switch for supplying either the L+R or M signals to a third output terminal. The generation of the changeover devices are controlled by signals supplied to external control terminals. The IC is adapted for use in both television receivers and VTR's and is adaptable to use with different methods of multisound transmissions.

7 Claims, 4 Drawing Sheets

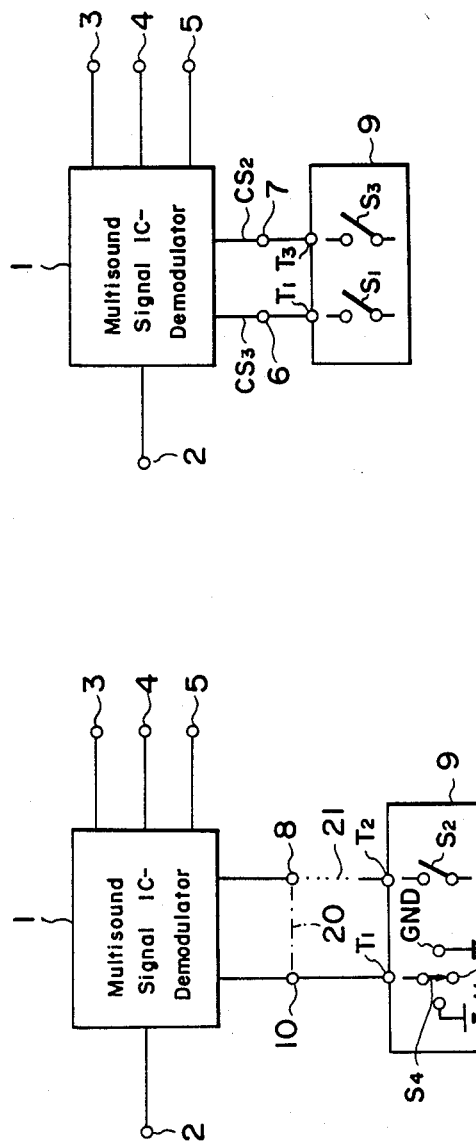

INTERGRATED MULTISOUND SIGNAL DEMODULATOR CIRCUIT

BACKGROUND OF THE INVENTION

1. Field of the Invention

The present invention relates to an integrated multisound signal demodulator circuit.

A method of multisound transmission is currently in use in the television broadcasting systems in both Japan and U.S.A., and application of such technique is gradually spreading in other countries as well. This method enables reception of a stereophonic or bilingual broadcast, which is different from the conventional monaural audio transmission, due to multiplexing the signals. According to the multisound television broadcasting system adopted in Japan, two signals are multiplexed, and a stereophonic or bilingual broadcast is selectable by switching. Meanwhile, according to the multisound television (SAP) broadcasting system in U.S.A., three signals are multiplexed so that simultaneous stereophonic and bilingual broadcasts are possible. The background is based on the fact that the bilingual broadcasting has an extremely great importance since U.S.A. is a multilingual country. Although some differences are existent in the multiplexing techniques relative to the multisound broadcasting systems employed in countries other than Japan and U.S.A., the basic idea is exactly the same with regard to the purpose of enabling reception of both stereophonic and bilingual signals.

The apparati to be equipped with the function of multisound signal demodulation are principally television receivers and video tape recorders, which are gradually spreading into wider use today, and it is estimated that the function will shortly be included in all such apparatus except those of the standard class.

Now a description will be given on the output signal control system for a multisound signal demodulator in the television receiver. The demodulator used in such apparatus is formed into an IC (semiconductor integrated circuit). Presently, several kinds of integrated circuits are available for such demodulator, and employment thereof is advantageous in mountability and economy. Meanwhile, from the viewpoint of the designer the integrated circuit, it is desired that the multisound signal demodulator be usable for both a television receiver and a video tape recorder in common. However, in the current technical stage, the multisound signal IC-demodulator fails to satisfy completely the requirements for the video tape recorder, although capable of meeting most of the requirements for the television receiver.

Hereinafter this problem will be described in detail. The simplest multisound signal demodulator is equipped with a single-line output (two channels for stereo), for either of the stereo or bilingual broadcasts to be output, on the basis of the user's selection and the broadcasting mode. In this case, no particular difference exists between the requirements for the television receiver and the video tape recorder.

However, any higher-class apparatus is equipped with another output. FIG. 5 shows the constitution of such conventional multisound signal IC-demodulator with regard to its mode control. In FIG. 5. a multisound signal is fed to an external input terminal 2 of the multisound signal IC-demodulator 1, and a first or second sound signal is obtained from first and second external output terminals 3 and 4. Meanwhile, another output of the first and second external output terminals 3 and 4 is manifested at a third external output terminal 5. First and third external control terminals 6 and 7, for controlling the mode of the multisound signal IC-demodulator 1, are connected respectively to signal output terminals T1 and T3 of a switching signal generator 9. Control signals for the two external control terminals 6 and 7 may be produced by a variety of means. With regard to a typical example, where the first external control terminal 6 is used for controlling the selective changeover of the first and second sound signals, and the third external control terminal 7 is used for compulsorily rendering monaural the first sound signals of left and right channels output to the first and second external output terminals 3 and 4, an explanation will be given of the operation modes of the stereo/bilingual switching system as they have been adopted in Japan. For reception of a stereo broadcast, there are two modes relative to the output state, corresponding to the operation mode of the two external control terminals 6 and 7: i.e., one mode where first sound signals of left and right channels are output to the first and second external output terminals 3 and 4; and another mode where a monaural first sound signal is output to the first and second external output terminals 3 and 4, in response to a predetermined control signal supplied to the third external control terminal 7 in a particular case.

Meanwhile, for receiving a bilingual broadcast, there are two modes relative to the output state, corresponding to the operation mode of the two external control terminals 6 and 7, i.e., one mode where the stereo first sound signal is output to the first and second external output terminals and 4 while the second sound signal is output to the third output terminal 5; and another mode where a monaural second sound signal is output to the first and second external output terminals 3 and 4 while the monaural first sound signal is output to the third external output terminal 5.

Furthermore, in the simultaneous stereo/bilingual broadcasting system adopted in U.S.A., exemplary output modes are listed in Table 1 below with the contents of the output sound signals obtained from the first through third external output terminals 3–5 being determined in accordance with "L" (logic low level) and "H" (logic high level) of control signals supplied to the external control terminals 6 and 7 during a stereo/bilingual broadcast mode.

TABLE 1

| Broadcast mode | Terminal 6 | Terminal 7 | First and second output terminals 3 and 4 | | Third output terminal 5 |
|---|---|---|---|---|---|
| | | | L 3 | R 4 | |
| | H | L | First sound | | Second sound (monaural) |
| | | | L | R | |
| Stereo + bilingual | H | H | First sound (compulsory) | | Second sound |

TABLE 1-continued

| Broadcast mode | Terminal 6 | Terminal 7 | First and second output terminals 3 and 4 | | Third output terminal 5 |
| --- | --- | --- | --- | --- | --- |
| | | | L 3 | R 4 | |
| broadcast | | L | monaural) Second sound L (monaural) | | (monaural) First sound (monaural) |

The television receiver mentioned above is so devised as to enable, through an earphone or headphone terminal, the monitoring of another signal different from the signal to which the user is presently listening (the second sound signal in the case of listening to the first sound signal, or the first sound signal in the case of listening to the second sound signal).

As for the video tape recorder, other modes are required which are different from those in the multisound signal IC-demodulator used in the above-described television receiver. In a ½-inch video tape recorder where a high-fidelity audio characteristic is required, the technical trend is changing from the conventional baseband audio track recording toward a hi-fi method of multiplexing video signals by frequency modulation (hereinafter such recording portion will be referred to as the hi-fi channel). And the 8-mm video tape recorder, succeeding the ½-inch type, has one frequency-modulated multiplex channel (AFM channel) and two PCM channels for stereo.

In the video tape recorder having three audio channels as mentioned, selection of such audio channels for recording signals therein is determined by the user's intention and purpose. That is, in case there is need for a foreign language (principally English in Japan or Spanish in the U.S.A.), a first main sound signal is recorded in the hi-fi channel of the ½-inch VTR or in the PCM channel of the 8-mm VTR, while a second sound signal is recorded in the baseband audio track of the ½-inch VTR or in the AFM channel of the 8-mm VTR. Meanwhile, if there is no need for recording the sound signal of a foreign language, the first sound signal is recorded on all of the entire channels, thus permitting reproducibility of the signals by a standard-class VTR (½-inch type without a hi-fi channel or by a 8-mm type without a PCM channel). Alternatively, a user, whose mother tongue is a foreign language, may record the second sound signal on all of the channels. Thus, the video tape recorders manufactured today are mainly of the type having two-line three audio channels. And it is ideal that selection of the audio channels for recording the first an second sound signals in the respective lines is adapted to comply with any combination, at the user's option.

However, the conventional multisound signal IC-demodulator outputs merely the signals of one line or is equipped with a third external output terminal to simultaneously provide at most another signal different from the output signals provided at the first and second external output terminals. Therefore, although no problem is existent with regard to the function for the television receiver the conventional demodulator is never adapted to meet the aforementioned requirements in a video tape reorder, and there has heretofore been no solution of the problem unless a functional compromise is made or in the case of the video tape recorder, a complicated external switching circuit is added.

OBJECT AND SUMMARY OF THE INVENTION

In view of the circumstances mentioned, an object of the present invention resides in providing an improved multisound signal IC-demodulator wherein, when a second sound signal is included in a multisound signal, control signals are supplied individually to first and second external control terminals so that first and second sound signals can be output selectively and independently from the first and second external output terminals and from the third external output terminal; and further a common control signal is supplied to the first and second external control terminals so that, in case the first sound signal is obtained from either the first and second external output terminals or from the third external output control terminal, the second sound signal can be obtained from the other terminal or terminals.

The present invention comprises a demodulating circuit for producing a sum signal L+R of first sound signals L and R of left and right channels, a difference signal L−R thereof and a second sound signal M from a multisound signal; a discriminating circuit for deciding whether the second sound signal M is included or not in the multisound signal; a matrix circuit for producing the first sound signals L and R or left and right channels from the sum signal L+R and the difference signal L−R supplied thereto; first and second changeover switches for selectively changing the first sound signals L and R of the left and right channels and the second sound signal M, and outputting the selected signals to first and second external output terminals: a third changeover switch for selectively changing the sum signal L+R and the second sound signal M, and outputting the selected signal to a third external output terminal; a first control circuit for controlling the first and second changeover switches in accordance with a first changeover control signal from a first external control terminal and the output of the discriminating circuit; and a second control circuit for controlling the third changeover switch in accordance with a second changeover control signal from a second external control terminal and the output of the discriminating circuit.

In the present invention, when the control signals are supplied individually to the first and second external control terminals, the first sound signals L and R of the left and right channels or the second sound signal M are output from the first and second external output terminals in response to such control signals, and independently thereof, the sum signal L+R or the second sound signal M is obtained from the third external output terminal. Meanwhile, when the common control signal is supplied to both the first and second external control terminals, the first sound signal L and R of the left and right channels (or the second sound signal M) are output from the first and second external output terminals in response to such control signal, and the second sound signal M (or the sum signal L +R) is obtained from the third external output terminal.

BRIEF DESCRIPTION OF THE DRAWINGS

FIGS. 3A, 3B and 4 are diagrams showing the relation of IC-DEM and an external switching signal generator according to the present invention; and FIG. 5 is a diagram showing the relation of IC-DEM and an external switching signal generator in the prior art.

DESCRIPTION OF THE PREFERRED EMBODIMENTS

Figure 1:
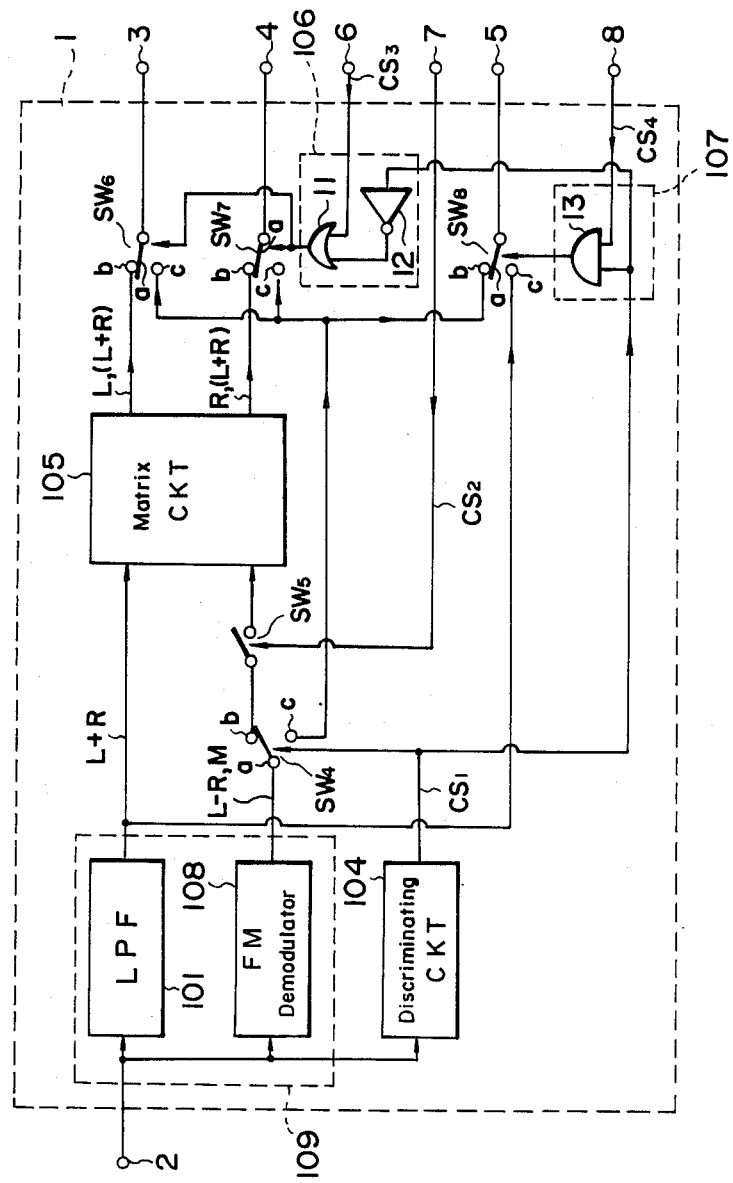
FIGS. 1 and 2 are block diagrams showing first and second embodiments representing IC-DEM according to the present invention.

Hereinafter the multisound signal demodulator, which is formed into an IC (semiconductor integrated circuit), will be described in detail with reference to FIGS. 1 through 4. FIG. 1 is a block diagram of an exemplary embodiment representing the multisound signal IC-demodulator of the present invention designed to receive a multisound television broadcast signal which is composed of two signal multiplexed by the system adopted in Japan.

In FIG. 1, a multisound signal produced by multiplexing sound signals of main and subsidiary channels is fed to an input terminal 2 of the multisound signal IC-demodulator (hereinafter referred to simply as IC-DEM).

The multisound signal is supplied to both a demodulating circuit 109, which consists of a low pass filter 101 and an FM demodulator 108, and a stereo/bilingual discriminating circuit 104. The LPF 101 provides, from the input multisound signal, a sum signal L+R of first sound signals (Japanese) L and R of the left and right channels, while the FM demodulating circuit 108 provides a difference signal L−R of the first sound signals L and R of the left and right channels or a second sound signal (English) M. The sum signal L+R obtained from the LPF 101 is supplied to both a matrix circuit 105 and a third external output terminal 5 via a fixed contact c and a movable contact a of a third changeover switch SW8.

The difference signal L−R obtained from the FM demodulator 108 in a stereo broadcast is supplied to the matrix circuit 105 via a movable contact a and a fixed contact b of a fourth changeover switch SW4, which is used for selecting the first or second sound signal, and also via a fifth changeover switch SW5 used for compulsory monaural. Meanwhile, the second sound signal M obtained from the FM demodulator 108 in a bilingual broadcast is supplied to the first and second external output terminals 3 and 4 via the movable contact a and the fixed contact a of the fourth changeover switch SW4 and also via the respective fixed contacts c and movable contacts a of the first and second changeover switches SW6 and SW7. Furthermore, the second sound signal M obtained from the FM demodulator 108 is output to a third external output terminal 5 via the fixed contact b and the movable contact a of the third changeover switch SW8.

The matrix circuit 105 executes addition and subtraction of the sum signal L+R and the difference signal L−R supplied thereto, hence producing the first sound signals L and R of left and right channels. These signals are then output to the first and second external output terminals 3 and 4 via the respective fixed contacts b and movable contact a of the first and second changeover switches SW6 and SW7.

The discriminating circuit 104 decides whether the broadcast is stereo or bilingual on the basis of a pilot signal of the multisound signal and thereby outputs a control signal CS1. For example, this control signal represents a logic low level "L" in the case of a stereo broadcast or a logic high level "H" in the case of a bilingual broadcast. When the control signal CS1 is "L", the movable contact a of the fourth changeover switch SW4 is connected to the fixed contact b, so that the difference signal L−R is supplied to the matrix circuit 105. And when the control signal CS1 is "H", the movable contact a is connected to the fixed contact c, so that the second sound signal M is supplied to the first, second and third changeover switches SW6, SW7 and SW8.

The fifth changeover switch SW5 is turned off by a compulsory monaural control signal CS2 for the first sound signal supplied to the third external control terminal 7, whereby the difference signal L−R is not supplied to the matrix circuit 105. In this case, the first sound signals fed to the first and second external output terminals 3 and 4 are combined with each other to become a monaural signal L+R.

The control signal CS1 obtained from the stereo/bilingual discriminating circuit 104 is supplied to a first control circuit 106 for the first and second changeover switches SW6 and SW7 and also to a second control circuit 107 for the third changeover switch SW6. First, the control signal CS1 supplied to an inverter (hereinafter referred to as INV) 12 of the first control circuit 106, and is phase-inverted therein, and then is supplied to one input of an OR gate 11. Another input of the OR gate 11 is connected to the first external control terminal 6 so that the control signal CS3 is supplied therefrom. The first and second changeover switches SW6 and SW7 are actuated by the output of the OR gate 11 so as to selectively supply the first sound signals L and R of the left and right channels, or the monaural signal L+R, or the second sound signal M, to the first and second external output terminals 3 and 4.

The second control circuit 107 consists of an AND gate 13, and the control signal CS1 from the stereo/bilingual discriminating circuit 104 is fed to one input of the AND gate 13. Another input of the AND gate 13 is connected to the second external control terminal 8 so that the control signal CS4 is supplied therefrom. The third changeover switch SW8 is actuated by the output of the AND gate 13 so as to selectively supply the monaural first sound signal L+R or the second sound signal M to the third external output terminal 5.

Now a description will be given on the operation of the circuit described above. First, in using the IC-DEM 1 of the present invention for a television receiver the second external control terminal 8, which supplies the control signal CS4 for selection of the sound signal output to the third external output terminal 5, is connected, as shown in FIG. 3A, in parallel to the first external control terminal 6 for selecting the output mode of the first and second external output terminals 3 and 4. A switching signal generator 9 has manually actuatable switches S1 and S3 and generates switching signals at its terminals T1 and T3. The terminal T1 is connected to the first and second control terminals 6 and 8 of the IC-DEM 1, while the terminal T3 is connected to the third control terminal 7. The switching signal from the terminal T1 serves as control signals CS3 and CS4, while the switching signal from the terminal T3 serves as a control signal CS2.

In FIG. 1, using the connections shown in FIG. 3A, the first and second external control terminals 6 and 8 are connected in parallel to each other, so that the control signals CS3 and CS4 supplied to such two terminals become mutually equal. Supposing now that the multisound signal fed to the input terminal 2 is for a stereo broadcast, then the control signal CS1 from the discriminating circuit 104 shown in FIG. 1 is "L", so that the movable contact a of the fourth switch SW4 is connected to the fixed contact b. The fifth changeover switch SW5 is turned off or on by the action of the switch S3 (FIG. 3A), whereby the control signal CS2 supplied to the third external control terminal 7 is "H" or "L" respectively. Thus, if a "L" control signal CS2 is supplied to the third external control terminal 7, the difference signal L−R obtained from the FM demodulator 108 and the sum signal L+R obtained form the LPF 101 are supplied to the matrix circuit 105 and are thereby processed, so that the first sound signals L and R of left and right channels are supplied to the first and second changeover switches SW6 and SW7 respectively. The fifth changeover switch SW5 is turned off when the control signal CS2 supplied to the third external control terminal is "H", so that the sum signal L+R supplied t o the matrix circuit 105 is supplied as a monaural signal to the respective fixed contacts b of the first and second changeover switches SW6 and SW7. Since the "L" control signal CS1 is fed to the INV 12 of the first control circuit 106 during a stereo broadcast, the output is inverted to "H" by the INV 12 and then is supplied to the input terminal of the OR gate 11. Consequently, when the "H" control signal CS3 is fed to the first external control terminal 6 through actuation of the switch S1, the output of the OR gate 11 is turned to "H", whereby the respective movable contacts a of the first and second changeover switches SW6 and SW7 are connected to the fixed contacts b, so that the first sound signals L and R of left and right channels or the monaural signal L+R thereof is output to the first and second external output terminals 3 and 4.

Meanwhile in a stereo broadcast, the "L" control signal CS1 is supplied to one input terminal of the AND gate 13 in the second control circuit 107, and the "H" control signal CS4 (=CS3) equal to the signal fed to the first control terminal 6 is supplied to another input terminal of the AND gate 13, whereby the output of the AND gate 13 is turned to "L". Therefore, the movable contact a of the third switch SW6 is connected to its fixed contact c, so that the monaural first sound signal L+R is output to the third external output terminal 5.

In receiving a bilingual broadcast the control signal CS1 from the stereo/bilingual discriminating circuit 104 is turned to "H" and thereby connects the movable contact a of the fourth changeover switch SW4 to the fixed contact c, so that the second sound signal M is supplied to the fixed contacts c of the first and second changeover switches SW6 and SW7 and also to the fixed contact b of the third changeover switch SW8. The "H" control signal CS1 output as a result of the detection of a bilingual broadcast by the stereo/bilingual discriminating circuit 104 is inverted to "L" by the INV 12 of the first control circuit 106 and then is supplied to the OR gate 11.

When the "L" control signal CS3 is fed to the first external control terminal 6 through actuation of the switch S1, the output of the OR gate 11 is turned to "L" to consequently connect the respective movable contact a of the first and second changeover switches SW6 and SW7 to the fixed contacts c thereof, so that the second sound signal M is output to the first and second external output terminals 3 and 4.

The "H" control signal CS1 is fed to one input of the AND gate 13 in the second control circuit 107, while the "L" control signal equal to the signal supplied to the first external control terminal 7 is fed to another input of the AND gate 13 through actuation of the switch S1, whereby the output of the AND gate 13 is turned to "L" to consequently connect the movable contact a of the third changeover switch SW8 to its fixed contact c, so that the monaural first sound signal L+R is output to the third external output terminal 5.

When the "H" control signal is supplied to both the first and second external control terminals 6 and 8, the "L" control signal inverted by the INV 12 is supplied to one input of the OR gate 11, whose output is thereby turned to "H" to consequently connect the respective movable contacts a of the first and second changeover switches SW6 and SW7 to the fixed contacts b, so that the monaural first sound signal L+R is output to the first external output terminal 3. Thus, the "H" signals, CS1 and CS4 are supplied to both inputs of the AND gate 13 in the second control circuit 107, and therefore the AND gate output becomes "H" to consequently connect the movable contact a of the third changeover switch SW6 to its fixed contact b, so that the second sound signal M is output to the third external output terminal 5.

Now a description will be given, with reference to FIG. 3B, on another case of using the IC-DEM 1 of the present invention for a video tape recorder. Denoted by 9 is a switching signal generator which has manually actuatable switches S1, S2 and S3 and generates switching signals at its terminals T1, T2 and T3 through actuation of the switches. The terminal T1 is connected to the first control terminal 6 of the IC-DEM 1, the terminal T2 to the second control terminal 8, and the terminal T3 to the third control terminal 7, respectively. The switching signal obtained from the terminal T1 serves as a control signal CS3, the switching signal from the terminal T2 as a control signal CS4, and the switching signal from the terminal T3 as a control signal CS2, respectively.

In FIG. 1, the outputs from the first and second external output terminals 3 and 4 and the third external output terminal 5 are controlled independently by the control signals supplied to the first and second external control terminals 6 and 8. That is, in a stereo broadcast alone, the control signal CS1 is "L", and when the "H" control signal CS2 is fed to the third external control terminal 7, the monaural first sound signal L+R is output to the first and second external output terminals 3 and 4 in case the control signal CS3 from the first external control terminal 6 is "H". And when the "L" control signal CS2 is fed to the third external control terminal 7, the first sound signals L and R of left and right channels are output respectively to the first and second external terminals 3 and 4. In a bilingual broadcast, the control signal CS1 is "H", and therefore when the "L" control signal CS3 is supplied to the first external control terminal 6, the second sound signal M is output to both the first and second external output terminals. Consequently, in a stereo broadcast, the monaural first sound signal L+R is output to the third external output terminal 5 regardless of whether the control signal CS4 supplied to the second external control terminal 8 is "L" or "H". Meanwhile in a bilingual broadcast, the second sound signal M is output to the third external output terminal 5 when the "H" control signal CS4 is supplied to the second external control terminal 8, or the monaural first sound signal L+R is output when the "L" control signal CS4 is supplied.

Figure 2:
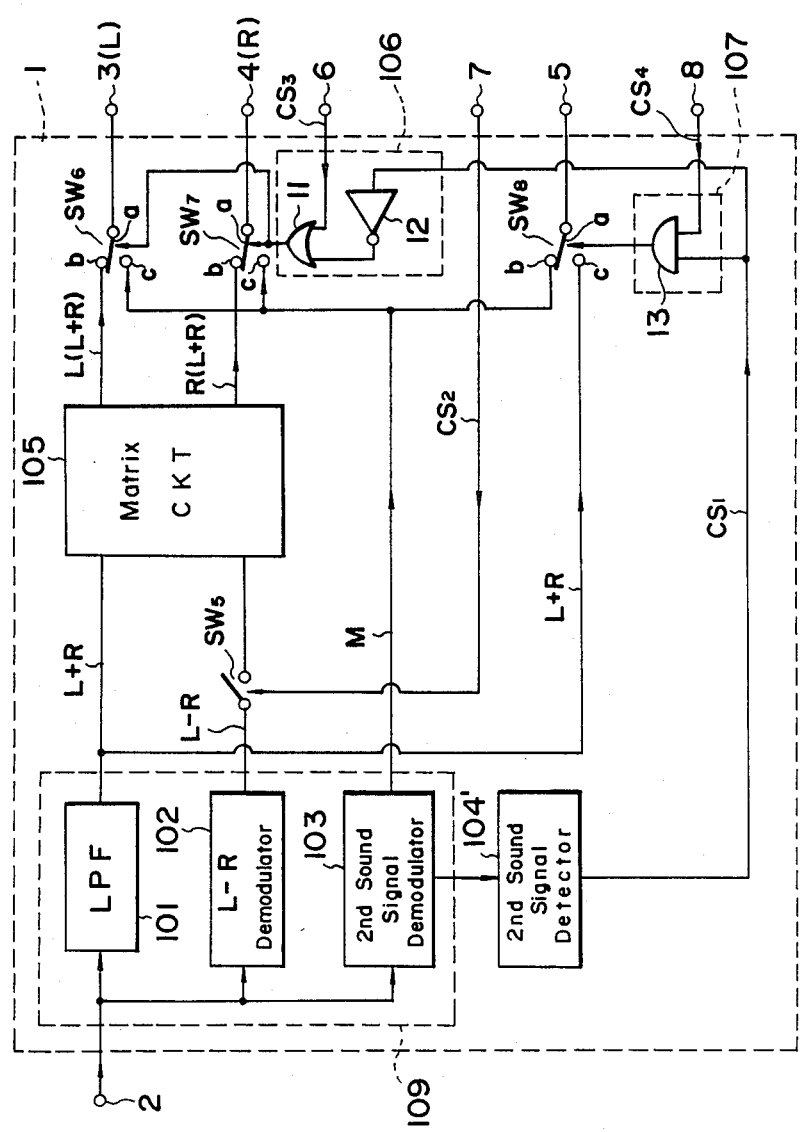

FIG. 2 is a block diagram of another exemplary IC-DEM 1 for the system where, as in the multisound television broadcasting adopted in U.S.A., three signals are multiplexed inclusive of first sound signals of the left and right channels and a second sound signal of a foreign language in a bilingual broadcast. In this diagram, the components corresponding to those shown in FIG. 1 are denoted by the same reference numerals and symbols, and a repeated explanation is omitted here. In FIG. 2, a demodulating circuit 109 comprises an LPF 101 for separating the sum signal L+R from a multisound signal, an L−R demodulator 102 for separating the difference signal L−R, and a second sound signal demodulator 103 for demodulating a second sound signal M. The difference signal demodulated by the L−R demodulator 102 is supplied to a matrix circuit 105 via a fifth changeover switch SW5, and the second sound signal M from the second sound signal demodulator 103 is supplied to the contacts c of first and second changeover switches SW6 and SW7 and also to the contact b of a third changeover switch SW8. And simultaneously the output of the second sound signal demodulator 103 is fed to a second sound signal detector 104' which detects the presence or absence of the second sound signal. The second sound signal detector 104' corresponds to the discriminating circuit 104 in the first embodiment shown in FIG. 1. In this constitution, with the exception that the fourth changeover switch SW4 shown in FIG. 1 is eliminated, the first and second control circuits 106 and 107 perform exactly the same operation. Also, with regard to the manner of using the IC-DEM 1 for the television receiver or the video tape recorder, the selective changeover is the same as mentioned previously in the point that the first and second external control terminals 6 and 8 are connected in parallel to or independently of each other for supplying the control signals.

FIG. 4 is a system diagram of another exemplary IC-DEM 1 embodying the present invention. In this embodiment, the IC-DEM 1 is equipped with a second control terminal 8 and a first/third external control terminal 10 which serves as both a first external control terminal 6 for switching first and second sound signals, and a third external control terminal 7 for obtaining a compulsory monaural signal.

The control signal supplied from the switching signal generator 9 to the first/third external control terminal 10 is selectively changed by the switch S4 to three states as shown in Table 2, where GND, OPEN and +V correspond respectively to the main outputs of the first and second external output terminals 3 and 4. (The stereo output in the "OPEN" state becomes monaural during non-transmission of stereo signal.) When the switch S4 is connected to GND, "L" is supplied as CS2 and CS3, while the switch S4 is connected to +V, "H" is supplied as CS2 and CS3. When the switch S4 is connected to OPEN, "H" is supplied as CS3 and "L" is supplied as CS2, which can be achieved by, for example, properly setting the threshold voltage of the switch SW5 and the OR gate. The switch states of the main output are shown in Table 2.

TABLE 2

|  | GND | OPEN | +V |
|---|---|---|---|
| Main output | Second sound (monaural) | First sound (stereo) | First sound (compulsory monaural) |

Table 3 shows the switched states of the subsidiary output of the third external output terminal 5 corresponding to the above GND, OPEN and +V, by supplying "L" for GND and "H" for OPEN and +V to the second external control terminal.

TABLE 3

|  | GND | OPEN | +V |
|---|---|---|---|
| Subsidiary output | First sound | Second sound |  |

Figure 3B:
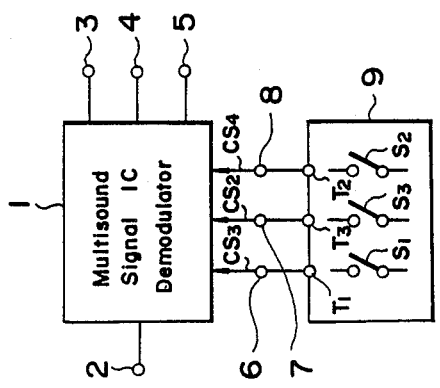
Figure 3A:
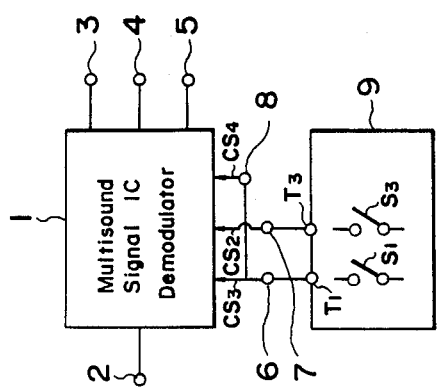

In this embodiment, if a connection 21 is made with removal of a connection 20 in FIG. 4, the first and second sounds can be output in a desired combination as in the aforementioned embodiment of FIG. 3B, so that it is adapted for application to the video tape recorder. To the contrary, if a connection 20 is made with removal of a connection 21, the third external output terminal 5 is rendered utilizable for another output as in the aforementioned embodiment of FIG. 3A, and therefore it is adapted for application to the television receiver.

According to the present invention described hereinabove, there can be accomplished an improved multisound signal IC-demodulator wherein, when a second sound signal is included in a multisound signal, first and second sound signals are selectively switched, by supplying individual control signals to first and second external output terminals, and are output independently of each other from the first and second external output terminals and the third external output terminals. And by supplying a common control signal to first and second external control terminals, the first sound signal is obtained from either the first and second external output terminals or the third external output terminal, while the second sound signal is obtained from the other terminal.

It will be apparent that various modifications and/or additions may be made in the apparatus of the invention without departing from the essential feature of novelty involved, which are intended to be defined and secured by the appended claims.

I claim as my invention:

1. A multisound signal IC-demodulator comprising:
   a demodulating circuit for producing a sum signal L+R of first sound signals L and R of left and right channels, a difference signal L−R thereof and a second sound signal M from a multisound signal;
   a discriminating circuit for detecting whether said second sound signal M is included or not in said multisound signal;
   a matrix circuit for producing the first sound signal L and R of left and right channels form said sum signal L+R and difference signal L−R supplied thereto;
   first and second changeover switches for selectively changing said first sound signals L and R of left and right channels and said second sound signal M, and supplying the selected signals to first and second external output terminals;
   a third changeover switch for selectively changing between said sum signal L+R and said sound signal M, and supplying the selected signal to a third external output terminal;

a first control circuit for controlling said first and second changeover switches in accordance with a first changeover control signal from a first external control terminal and the output of said discriminating circuit;

a second control circuit for controlling said third changeover switch in accordance with a second changeover control signal form a second external control terminal and the output of said discriminating circuit; and a fourth changeover switch connected to selectively supply said difference signal to said matrix circuit and controlled by a compulsory monaural control signal supplied to a third external control terminal, to control the supply said different signal L−R to said matrix circuit.

2. A multisound signal IC-demodulator according to claim 1, wherein said first control circuit and said second control circuit both include means for inhibiting selection of said second sound signal M by said first, second and third changeover switches, when said discriminating circuit doe not detect said second sound signal M in said multisound signal.

3. A multisound signal IC-demodulator according to claim 1, wherein said demodulating circuit includes a low pass filter and an FM demodulator.

4. A multisound signal IC-demodulator according to claim 1, wherein said demodulating circuit includes a low pass filter, an L−R demodulator and a second sound signal demodulator.

5. A multisound signal IC-demodulator according to claim 1, wherein said first control circuit comprises an inverter and an OR gate.

6. A multisound signal IC-demodulator according to claim 1, wherein said second control circuit comprises an AND gate.

7. A multisound signal IC-demodulator comprising:

a demodulating circuit for producing a sum signal L+R of first sound signals L and R of left and right channels, a difference signal L−R thereof and a second sound signal M from a multisound signal;

a discriminating circuit for detecting whether said second sound signal M is included or not in said multisound signal;

a matrix circuit for producing the first sound signal L and R of left and right channels from said sum signal L+R and difference signal L−R supplied thereto;

first and second changeover switches for selectively changing said first sound signals L and R of left and right channels and said second sound signal M, and supplying the selected signals to first and second external output terminals;

a third changeover switch for selecting said sum signal L+R or said second sound signal M, and supplying the selected signal to a third external output terminal;

a first control circuit connected to said discriminating circuit for controlling said first and second changeover switches in accordance with a first changeover control signal from a first external control terminal and the output of said discriminating circuit; and a second control circuit connected to said discriminating circuit for controlling said third changeover switch in accordance with a second changeover control signal from a second external control terminal and the output of said discriminating circuit.

* * * * *